June 17, 1924.

T. J. FAY 1,498,161

SHOCK ABSORBER

Filed Feb. 18, 1921

INVENTOR
Thomas J. Fay
BY
Rosenbaum Stockbridge & Bost
ATTORNEYS

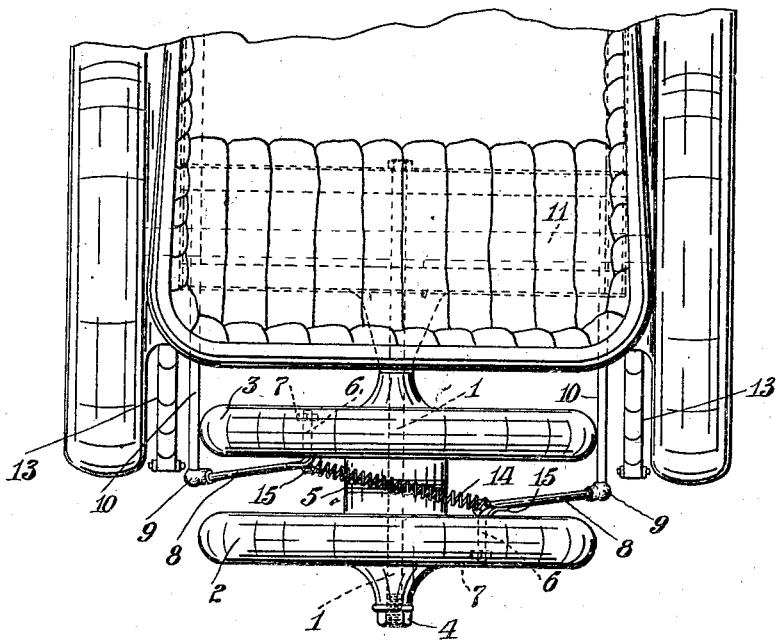
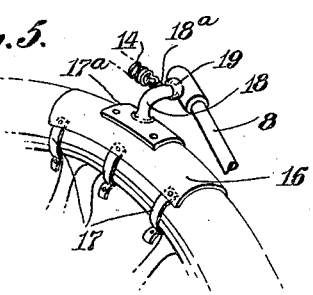

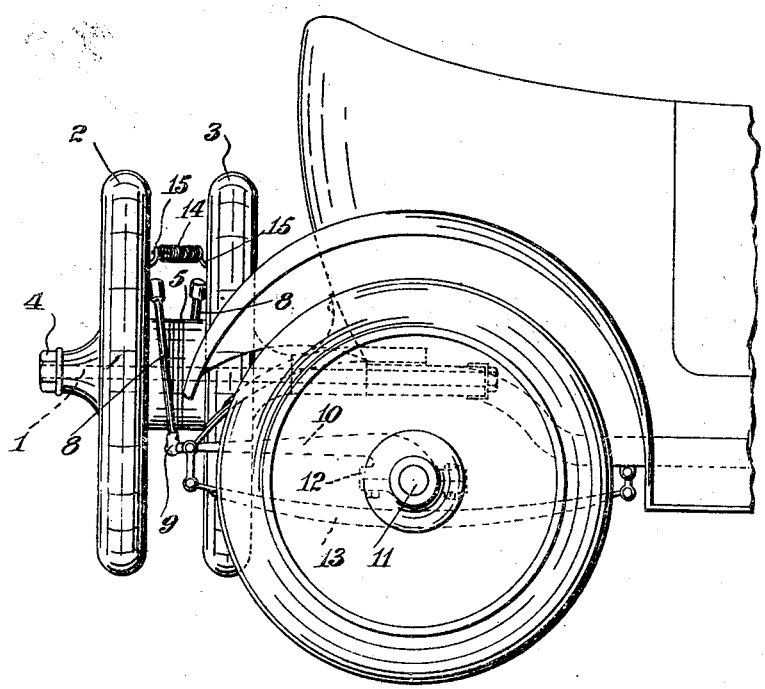
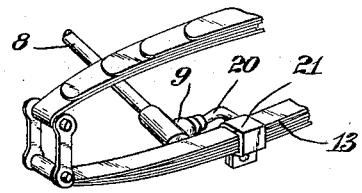

Patented June 17, 1924.

1,498,161

UNITED STATES PATENT OFFICE.

THOMAS J. FAY, OF BROOKLYN, NEW YORK.

SHOCK ABSORBER.

Application filed February 18, 1921. Serial No. 446,044.

*To all whom it may concern:*

Be it known that I, THOMAS J. FAY, a citizen of the United States, residing at Brooklyn, in the county of Kings and State of New York, have invented certain new and useful Improvements in Shock Absorbers, of which the following is a full, clear, and exact description.

This invention relates to devices for stabilizing vehicle body movements while the vehicle is passing over an uneven roadway, and has for an object the provision of a device of this kind for connection between the body or frame and the rear axle which will be effective in resisting relative movements of the frame or body and axle in a manner to improve the riding qualities of the vehicle by preventing the jouncing and bouncing of its occupants due to the unevenness of the roadway, especially when the vehicle is moving with considerable speed. A further object is to provide a vibration or shock absorber which can be applied to vehicles without material changes in their design, which adds a minimum of extra weight to the fully equipped vehicle, and which is simple and inexpensive in construction and durable and efficient in operation.

Other objects and advantages will be apparent from the following description and the novel features of my invention will be particularly pointed out in claims.

In carrying out my invention, I utilize the spare wheels, that may be or are frequently carried upon the rear end of vehicles, as balance wheels, and connect crank rods between eccentric portions of the wheels and relatively stiff portions of the lower springs or the axle whereby the mass of the wheels resists the relative movements of body and axle. I also provide suitable friction means for resisting rotary movements of the wheels and thereby offering additional resistance to the relative movements of the body and axle. Springs or other resilient means are provided for assisting in maintaining the wheels in a normal position, the springs also resisting movement of each wheel in the direction caused by a separation of the body and axle. I may attach the crank rods to the inflated tires of the spare wheels in a manner to utilize the resiliency of the tire in resisting relative movements of the body and axle. The invention also contemplates various details and arrangements which will be hereinafter described in connection with the accompanying drawing in which:

Fig. 2 is a plan of the same.

Fig. 3 is a side elevation of the same.

Fig. 5 is a perspective illustrating a connection between a spoke wheel and the crank rod, and Fig. 6 is a perspective illustrating a modified form of connection between the crank rod and axle.

Figure 1:
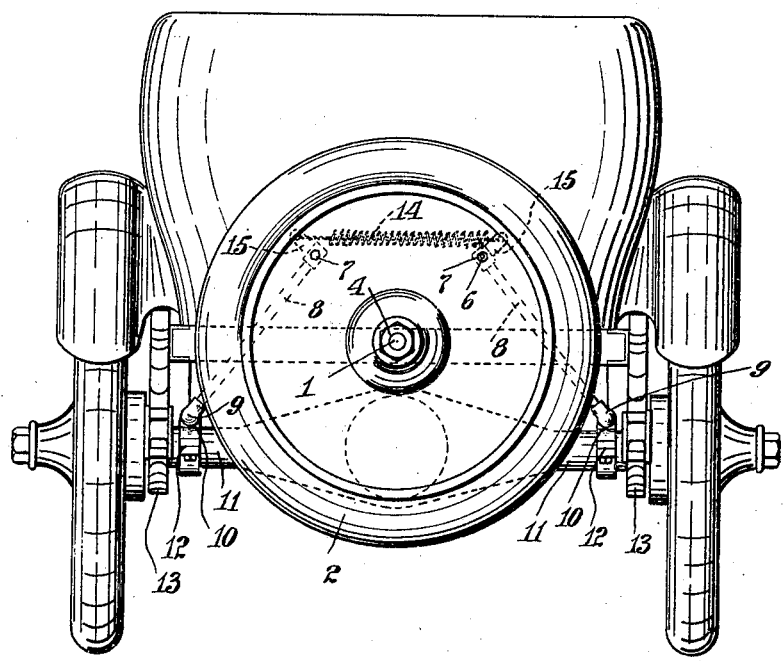
Fig. 1 is an elevation of the rear end of an automobile with the spare wheels of the disc type utilized in accordance with my invention.
Figure 4:
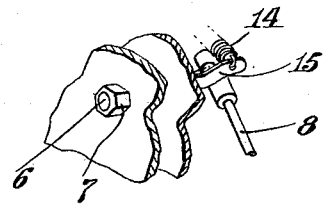
Fig. 4 is a perspective illustrating one manner of connecting the crank to a disc wheel.

In the illustrated embodiment of my invention the frame of the vehicle is provided at its rear end with a shaft 1 projecting rearwardly from the body, upon which shaft is mounted a pair of spare wheels 2 and 3 for use in case of emergency to replace those upon the axles. The wheels 2 and 3 are rotatably mounted upon the shaft 1 and are held thereon by a nut 4 adjustably carried by the free end of the shaft. A plurality of friction discs 5 are disposed on the shaft 1 between the spare wheels for the purpose of providing friction between the wheels so as to resist relative movement of the wheels in opposite directions. The effectiveness of this friction can be varied to some extent by the adjustment of the nut 4 on the end of the shaft 1. When the disc type of wheels are employed, as illustrated in Figs. 1 to 4, I secure to the web of each of the same, eccentrically of the axis of rotation, a pivot member 6 which preferably passes through the web and is held against removal by a nut 7 upon the end of the same. A crank rod 8 is pivotally attached at one end by means of a ball and socket connection to the pivot member 6 and at its other end is provided with a similar pivotal or universal connection 9 to the bracket arm 10 extending rearwardly from the rear axle 11 of the vehicle, there being a separate crank rod 8 and bracket arm 10 for each wheel. The bracket arms are preferably each formed as an extension of one section of the split clamp 12 that clamps a leaf spring 13 to the axle. As the axle and body separate and approach one another during the movement of the vehicle over an uneven roadway, the crank rods will produce oscillations of the spare wheels to which they are connected and the mass of the wheels will cause them to act in the nature of fly wheels or balance wheels and tend to resist the relative movements of the axle and body. A suitable spring 14 is connected between ears 15 of the pivot members 6 of each wheel so that upon relative movement of the wheels in opposite directions by the crank members, as the body and axle separate, the spring will resist this movement and will tend to restore the wheels to their normal positions upon the approach of the axle and body toward one another.

In Figure 5, I have illustrated one manner in which the crank rod can be connected to a spare wheel having spokes instead of a continuous web, and according to which I provide a jacket or a flexible member 16 strapped around the tire and felly of the wheel by suitable means such as straps 17. This jacket may extend entirely around the tire and also act as a protector therefor or it can be limited in length as illustrated. Each member 16 carries a metal plate 17a having an offset rod 18 with a ball shaped bearing tip 19, for connection to a crank rod 8. The spring 14 is connected between ears 18a on the rods 18. In this form of the invention the inflated tires of the spare wheels add their resiliency to resist the tendency of the crank rods 8 to oscillate the wheels whenever the axle and body separate or approach one another.

In some instances, it may be desirable to attach the rods 10 to the lower leaf springs 13 adjacent their connection to the axle so that the shock upon the spare wheels by sudden separation or approach of the axle and body will be partially absorbed by the leaf springs as well as by the spare wheels, the spring 14 and the friction discs 5. I therefore provide instead of the rods 10, the arms 20 projecting from clamps 21 which can be secured to the leaf springs 13 at any desired adjustable positions along the same.

In the operation of my device the spare wheels are mounted upon the rearwardly extending shaft 1 with the friction discs between them, the spring 14 connected between the pivot members 6 or 18 and the cranks connected to the wheels, after which the vehicle is ready for operation. As the vehicle passes over irregularities in the roadway, the axle and body will separate and approach one another which will cause the spare wheels to be oscillated in opposite directions by means of the crank rod connections between them and the axle. The mass of the wheels, together with spring 14 and the friction discs 5, will tend to resist this relative movement and prevent unpleasant jolts and jounces of the occupants of the vehicle, now commonly experienced with the ordinary vehicle. It will be observed that in accomplishing this, practically no additional parts having any considerable weight are added to the vehicle, since the usual spare wheels carried for emergency purposes may be utilized to accomplish the result desired. It will be observed that very little change in the design or construction of the vehicle in order to apply my invention thereto is necessary.

If tire trouble is encountered and it is necessary to change wheels, the pivot member 6 or the jacket 16 is removed from one of the spare wheels, this wheel removed and interchanged with the wheel having the damaged tire, the pivot member 6 or jacket 16 attached to the interchangeable spare wheel, and the device is again ready for further operation.

It will be understood that spare tire carriers and other like forms or bodies may be utilized for the inertia elements in cases where demountable rims are used, or where it is not necessary or desirable to carry actual wheels. The spare wheels or spare tire carriers are particularly useful because they serve the double function of the inertia element and the support for the spare tires.

It will be obvious that various changes in the details of construction herein described and illustrated may be made within the principle and scope of the invention.

I claim:

1. A shock absorber for resisting excessive and violent movements between the body and axle, which comprises a shaft projecting rearwardly from the body, a pair of spare wheels carried by and mounted to rotate on said shaft, a crank rod connected at one end to each wheel eccentrically thereof, and means connecting the other ends of the crank rod to the axle, whereby relative movements of the body and axle will oscillate said wheels.

2. A shock absorber for automobiles having a body and an axle, comprising a spare wheel for the automobile rotatably and removably carried by the body, and a crank device between the wheel and axle whereby relative movements of the body and axle will oscillate the wheel and be retarded by its inertia.

3. A shock absorber for automobiles having a body and an axle, comprising a spare wheel for the automobile rotatably and removably carried by the body, a crank device between the wheel and axle whereby relative movements of the body and axle will oscillate the wheel and be retarded by its inertia, and additional means for retarding oscillation of the wheel.

4. A shock absorber for automobiles having a body and an axle, comprising a fly wheel rotatably carried by the body, a crank device between the wheel and axle whereby relative movements of the body and axle will oscillate the wheel and be retarded by its inertia.

5. A shock absorber for automobiles having a body and an axle, comprising a pair of wheels rotatably carried by the body, crank means connecting the wheels to the axle whereby relative movements of the body and axle will oscillate the wheels in opposite directions, and means interposed between the wheels for resisting relative movement thereof.

6. A shock absorber for automobiles having a body and an axle, comprising a pair of wheels rotatably carried by the body, crank means connecting the wheels to the axle whereby relative movements of the body and axle will oscillate the wheels in opposite directions, and frictional means interposed between the wheels for resisting relative movement thereof.

7. A shock absorber for automobiles having a body and an axle, comprising a pair of wheels rotatably carried by the body, crank means connecting the wheels to the axle whereby relative movements of the body and axle will oscillate the wheels in opposite directions, and a resilient device interposed between the wheels for resisting relative movement thereof and for assisting in returning the wheels to normal positions.

8. A shock absorber for automobiles having a body and an axle, comprising a pair of wheels rotatably carried by the body, crank means connecting the wheels to the axle whereby relative movements of the body and axle will oscillate the wheels in opposite directions, frictional means interposed between the wheels for resisting relative movement thereof, and a resilient device interposed between the wheels for resisting relative movement thereof and for assisting in returning the wheels to normal positions.

9. A shock absorber for automobiles having a body and an axle, a wheel rotatably carried by the body, crank means connecting the wheel and axle whereby relative movements of the body and axle will oscillate the wheel and a resilient device connected to the wheel for resisting rotary movement of the wheel in one direction and for assisting in returning the wheel to normal position.

10. A shock absorber for automobiles having a body and an axle, a wheel rotatably carried by the body, crank means connecting the wheel and axle whereby relative movements of the body and axle will oscillate the wheel, frictional means for resisting movement of the wheel on the body, and a resilient device connected to the wheel for resisting rotary movement of the wheel in one direction and for assisting in returning the wheel to normal position.

11. A shock absorber for automobiles having a body and an axle, comprising a spare automobile tire carrier with inflated tire rotatably carried by the body, and crank means connected between the tire and the axle whereby relative movements of the axle and body will oscillate the tire carrier and be retarded by the inertia of the wheel and the resiliency of the inflated tire.

12. A shock absorber for automobiles having a body and an axle, comprising a spare wheel with inflated tire rotatably carried by the body, crank means connected between the tire and the axle whereby relative movements of the axle and body will oscillate the wheel, and means for retarding movements of the wheel.

13. A shock absorber for automobiles having a body and an axle, comprising a spare wheel with inflated tire rotatably carried by the body, crank means connected between the tire and the axle whereby relative movements of the axle and body will oscillate the wheel, and frictional means for retarding movements of the wheel.

14. A shock absorber for automobiles having a body and an axle, comprising a spare wheel with inflated tire rotatably carried by the body, crank means connected between the tire and the axle whereby relative movements of the axle and body will oscillate the wheel and resilient means for resisting movement of the wheel in the direction produced by a separation of body and axle and tending to return the wheel to normal position.

15. A shock absorber for automobiles having a body and an axle, comprising a spare wheel with inflated tire rotatably carried by the body, crank means connected between the tire and the axle whereby relative movements of the axle and body will oscillate the wheel, frictional means for retarding movements of the wheel, and resilient means for resisting movement of the wheel in the direction produced by a separation of body and axle and tending to return the wheel to normal position.

16. A shock absorber for vehicles having a body, and axle and a leaf spring between the body and axle, said absorber comprising a spare vehicle wheel rotatably carried by the body, a crank rod pivotally connected at one end to the wheel eccentrically thereof, and means pivotally connecting the other end of the rod to the spring adjacent its connection to the axle, whereby relative movements of the axle and body will oscillate the wheel.

17. A shock absorber for vehicles having a body, an axle, and a leaf spring between the body and axle, said absorber, comprising a spare vehicle wheel rotatably carried by the body, a crank rod pivotally connected at one end to the wheel, eccentrically thereof, and a member clamped to the spring intermediate of its ends and having a substantially universal pivotal connection to the other end of the crank rod whereby relative movements of the axle and body will produce an oscillation of the wheel.

18. A shock absorber for vehicles having a body, an axle, and a leaf spring between the body and axle, said absorber comprising a wheel rotatably carried by the body, a crank rod pivotally connected at one end to the wheel, eccentrically thereof, a member clamped to the spring intermediate of its ends and having a substantially universal pivotal connection to the other end of the crank rod whereby relative movements of the axle and body will produce an oscillation of the wheel, and a frictional device for retarding the oscillations of the wheel.

19. A shock absorber for vehicles having a body, an axle, and a leaf spring between the body and axle, said absorber comprising a wheel rotatably carried by the body, a crank rod pivotally connected at one end to the wheel, eccentrically thereof, a member clamped to the spring intermediate of its ends and having a substantially universal pivotal connection to the other end of the crank rod whereby relative movements of the axle and body will produce an oscillation of the wheel, and means for damping the oscillations of the wheel.

20. A shock absorber for automobiles having a body and an axle, a shaft carried by the body, a pair of spare wheels rotatably mounted on the shaft, friction discs between the wheels, means for forcing the wheels together to increase the friction created by the discs, crank means connecting the wheels to the axle whereby relative movements of the body and axle will oscillate the wheels in directions opposite to one another, and resilient means connecting the wheels to resist rotation of the wheels in the directions caused by a separation of the body and axle and assisting in restoring the wheels to normal position.

21. A shock absorber for automobiles having a body and an axle, a spare automobile wheel rotatably carried by the body, a pivot device removably attached to said wheel eccentrically of its axis of rotation, and crank means attached to said pivot and to the axle whereby relative movements of the body and axle will oscillate the wheel.

22. A shock absorber for automobiles having a body and an axle, a spare automobile fly wheel rotatably carried by the body, a pivot device removably attached to said wheel eccentrically of its axis of rotation, crank means attached to said pivot and to the axle whereby relative movements of the body and axle will oscillate the wheel, and means for resisting oscillations of the wheel and be retarded by the inertia of said wheel.

23. A shock absorber for automobiles having two relatively moving parts, and comprising a wheel rotatably carried by one of the parts, and crank means connected to said wheel eccentrically to its axis of rotation and to the other of the said parts whereby relative movements of said parts will cause oscillations of said wheel.

24. A stabilizer for vehicles having a body part and a running gear, comprising a pair of inertia elements rotatably carried by said body part, and means connecting said elements to spaced points of said running gear at opposite sides thereof whereby relative movement between the body part and either of said points of the running gear will cause a rotation of one of the elements independently of the other element and said movement will be materially retarded by the inherent inertia of said rotated element.

25. A stabilizer for vehicles having a body part and a running gear, comprising a pair of inertia elements rotatably carried by said body part, means connecting said elements to spaced points of said running gear at opposite sides thereof whereby relative movement between the body part and either of said points of the running gear will cause a rotation of one of the elements and said movement will be materially retarded by the inherent inertia of said rotated element, and resilient means constantly tending to rotate the elements in opposite directions opposed to those movements imparted to them when the body part and running gear partake of a given relative movement.

26. A stabilizer for vehicles having a body part and a running gear, comprising a pair of inertia elements rotatably carried by said body part, means connecting said elements to spaced points of said running gear whereby relative movement between the body part and either of said points of the running gear will cause a rotation of one of the elements and said movement will be retarded by the inertia of said rotated element, said elements being adapted for rotation in opposite directions in a given relative movement of the body part and running gear, and resilient means connected between said elements constantly tending to rotate them in directions opposed to those movements imparted to them when the body part and running gear partake of a given relative movement.

27. A stabilizer for vehicles having a body part and a running gear part which are adapted to approach and separate relatively to one another, comprising a spare tire carrier, and a connection between said carrier and said parts for causing rotary movement of the carrier when the parts approach one another or separate, whereby the inertia of the carrier will resist the relative movements of the parts.

28. A stabilizer for vehicles having a body part and a running gear part which are adapted to approach and separate relatively to one another, comprising a spare tire carrier, a connection between said carrier and said parts for causing rotary movement of the carrier when the parts approach one another or separate, whereby the inertia of the carrier will resist the relative movement of the parts and frictional means for also resisting the rotary movement of the carrier caused by the relative movement of said parts.

29. A stabilizer for vehicles having a body part and a running gear part which are adapted to approach and separate relatively to one another, a spare tire carrier, a connection between said carrier and said parts for causing rotary movement of the carrier when the parts approach one another or separate, whereby the inertia of the carrier will resist the relative movement of the parts and adjustable frictional means for variably resisting the movement of the carrier caused by the movement of said parts.

In witness whereof, I hereunto subscribe my signature.

THOMAS J. FAY.